Oct. 14, 1947.  R. L. SINCLAIR  2,428,856
VEHICLE PARKING APPARATUS
Filed Feb. 25, 1944  4 Sheets-Sheet 1
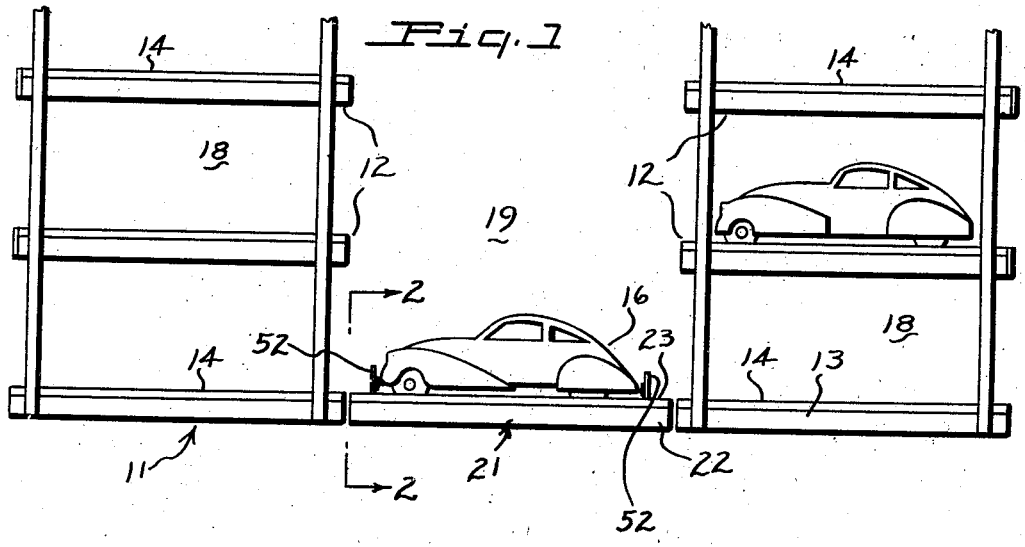
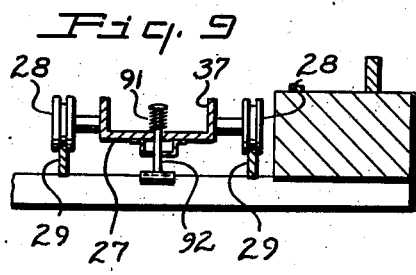
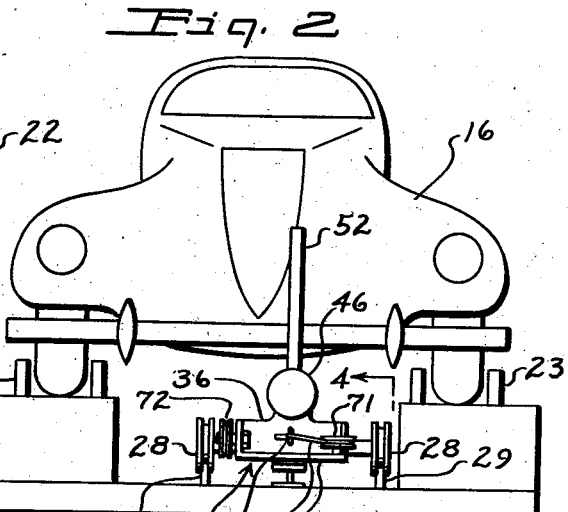
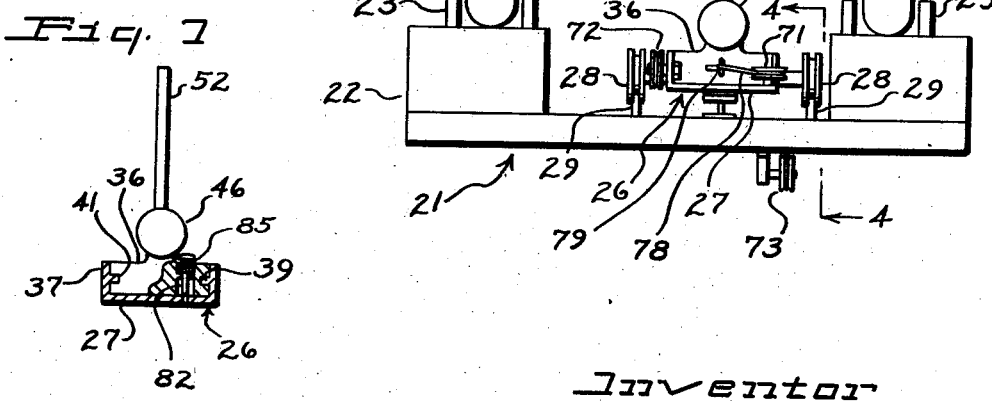
Inventor
Richard L. Sinclair
By
Atty.

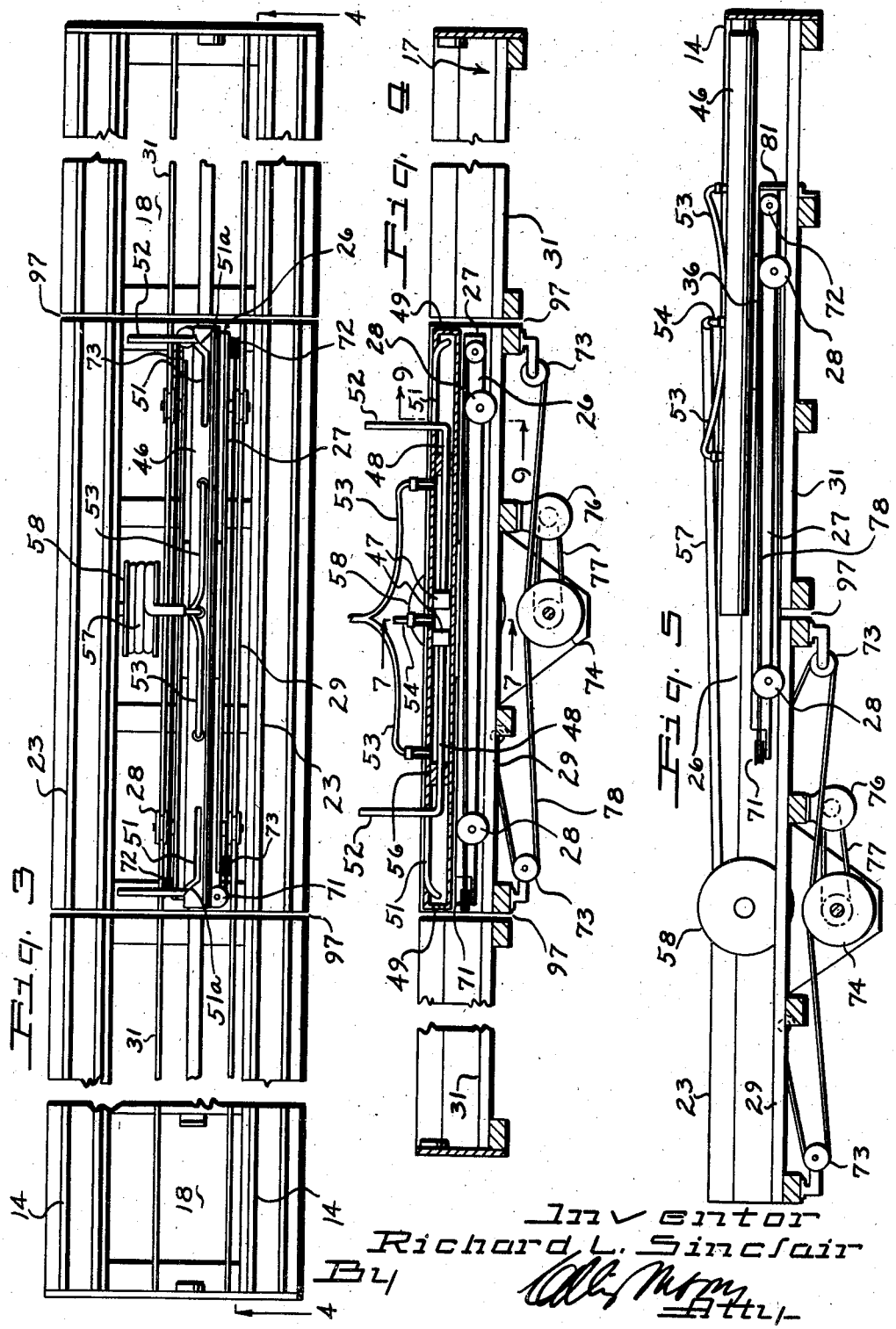

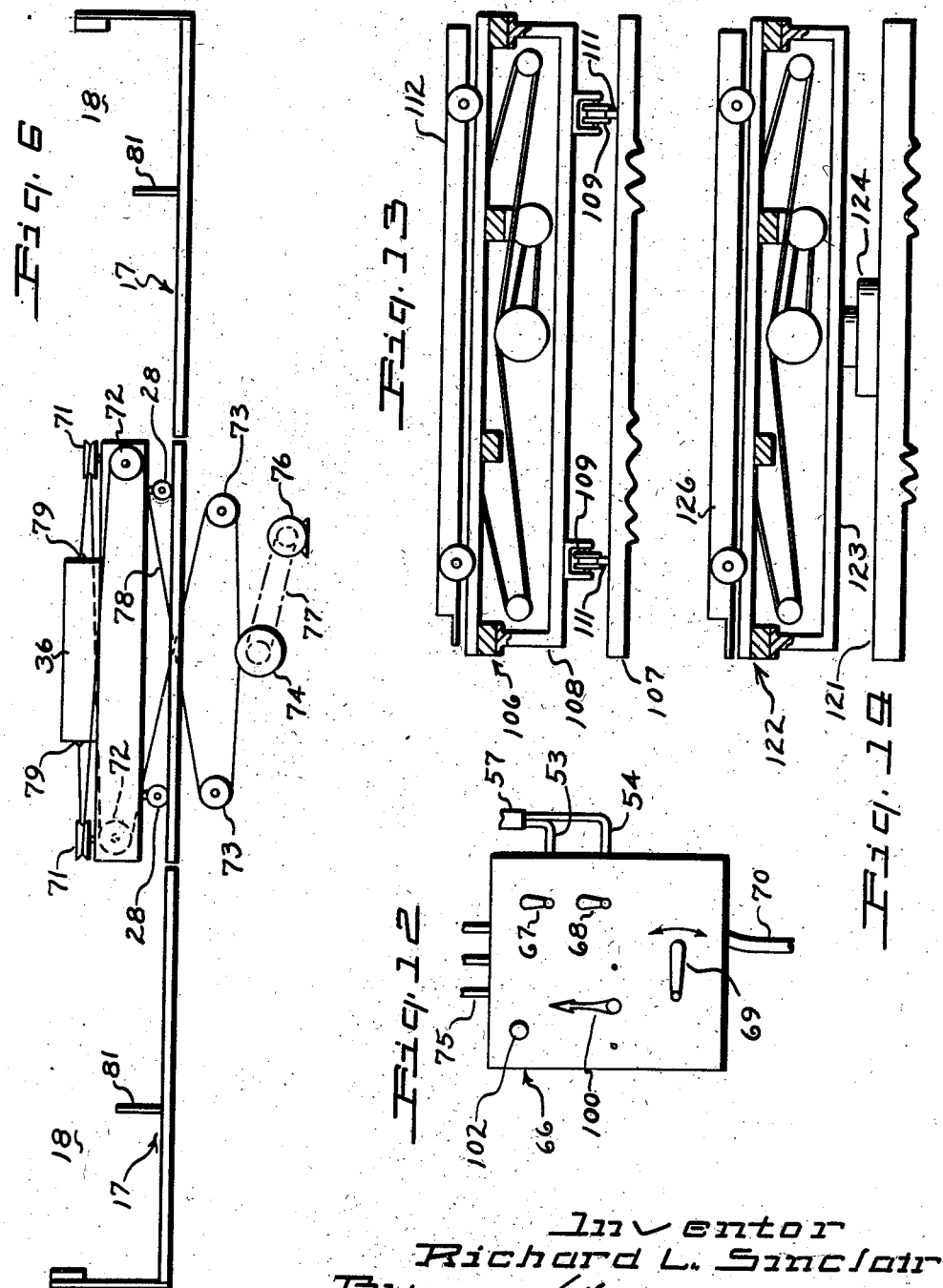

Oct. 14, 1947.  R. L. SINCLAIR  2,428,856
VEHICLE PARKING APPARATUS
Filed Feb. 25, 1944  4 Sheets-Sheet 4
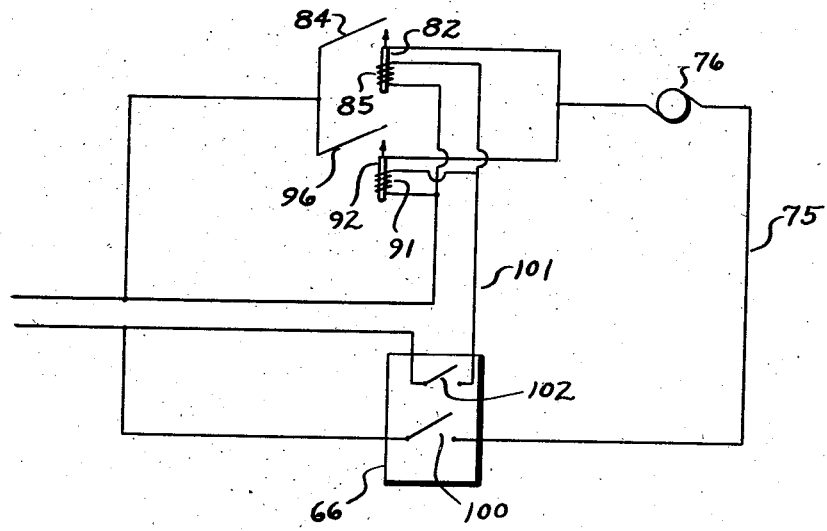
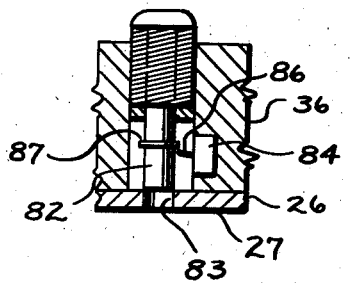
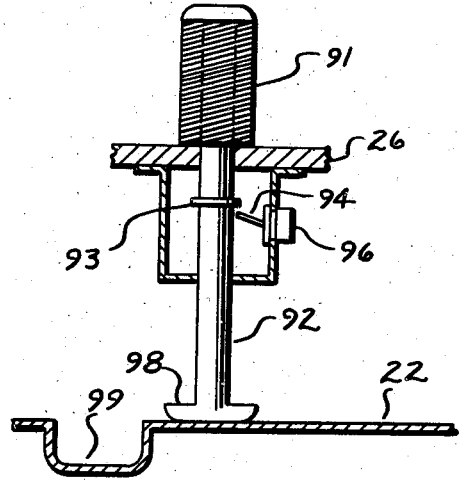
Inventor
Richard L. Sinclair
By
Atty.

Patented Oct. 14, 1947

2,428,856

UNITED STATES PATENT OFFICE 2,428,856

VEHICLE PARKING APPARATUS

Richard L. Sinclair, Los Angeles, Calif., assignor, by direct and mesne assignments, to Park-O-Mat, Inc., Los Angeles, Calif., a corporation of California Application February 25, 1944, Serial No. 523,959

6 Claims. (Cl. 104—50)

This invention relates to the art of material or article handling apparatus and more particularly to devices for accomplishing the automatic parking of vehicles.

Conventional parking systems have the inherent shortcoming that they require an impracticably large area which cannot be utilized as parking area and consequently cannot be called "pay space." For instance, the most usual conventional parking system utilizes a building provided with ramps for moving vehicles from one floor to another and a considerable amount of waste space for maneuvering the vehicles into and out of parked position. While I am aware that attempts have been made to overcome those disadvantages to some extent by automatic parking apparatus, such apparatus as have been devised have been of a prohibitively expensive and complicated nature and have also required too much space for the apparatus itself.

It is, therefore, one of the objects of my invention to overcome those disadvantages by providing a single, relatively inexpensive and simple automatic parking device which may be employed for automatically parking vehicles and in removing them from any selected one of a plurality of parking compartments or stalls whether those compartments be located on a common level or at different levels such as may be provided by the several floors of a building.

Another object, which may be said to be subordinate to the foregoing stated main objects, is the provision of a novel and efficient carrier for use in accomplishing the automatic parking and removal of vehicles from parking compartments.

Another object is the provision of an automatic parking device which may be so arranged and coordinated with, for instance, an elevator, as to permit of complete control from a central control board positioned at any desired remote point.

Still further objects and corresponding advantages are inherent in my invention and will become apparent from the following detailed description of one embodiment which I have chosen for purposes of explanation. I wish it understood, however, that the invention, in its broader aspects as defined by the accompanying claims, is not intended to be restricted or limited to the precise details of structure and arrangement now to be described, because it is susceptible to other modifications and arrangements which the following explanation will suggest to those working in this art.

For the purposes of the following description I shall refer to the accompanying drawings, in which:

Fig. 1 is a schematic view in side elevation, partly broken away to reduce the size of the figure, of a vehicle-storing device embodying the principles of the present invention;

Fig. 2 is a view in end elevation of the elevator and the vehicle supported thereby, the direction of view being indicated by arrow 2 of Fig. 1;

Fig. 3 is a top plan view of the elevator and the adjacent portions of the floors of two storage compartments with which the elevator is in alignment, portions of the figure being broken away to reduce its length;

Fig. 4 is a longitudinal, vertical sectional view, the plane of section being indicated by the lines 4—4 of Figs. 2 and 3, and the direction of view by the arrows.

Fig. 5 is a view similar to Fig. 4, but showing the carriage moved into one of the compartments.

Fig. 6 is a diagrammatic view illustrating the means for actuating the carriage and the vehicle-engaging means carried thereby;

Fig. 7 is a transverse, vertical sectional view taken through the carriage on the line 7—7 of Fig. 4 with the direction of view as indicated and showing the head which is movably mounted thereon partially in end elevation and partially broken away to show the lock whereby the head is fastened in centralized location on the carriage;

Fig. 8 is an enlarged, detail view in longitudinal, vertical section taken through the head to reveal diagrammatically the construction of the locking mechanism of Fig. 7;

Fig. 9 is a transverse, vertical section taken through the carriage on the line 9—9 of Fig. 4 with the direction of view as indicated to illustrate the mechanism for locking the carriage in centralized location on the bed of the elevator;

Fig. 10 is an enlarged detailed view in side elevation of the locking mechanism of Fig. 9;

Fig. 11 is a wiring diagram illustrating the method of actuating the locks of Figs. 8 and 10 as well as the motor which operates the carriage and the vehicle-engaging means carried thereby;

Fig. 12 is an enlarged view in front elevation of the control panel by means of which an operator can control all of the mechanism constituting the entire parking facility;

Fig. 13 is a view similar to Fig. 4 illustrating a modified form of elevator wherein means are provided for moving a vehicle transversely on the elevator so that a single elevator may be employed to serve a plurality of opposed pairs of storage compartments upon each floor of the storage facility; and Fig. 14 is another view similar to Figs. 4 and 13, but illustrating a still further modified form of construction for enabling a single elevator to serve more than a single pair of storage compartments upon each floor.

Generally speaking, the present invention contemplates a vehicle-storing structure divided into a plurality of individual storage compartments arranged on a common level or on a plurality of different elevations. Where different levels are used, I employ an elevator by means of which a vehicle can be conveyed to or from any selected one of the levels. Carriage or propelling means are provided in cooperative association with the elevator or other support for moving a vehicle therefrom into whichever one of the compartments may have been selected, and for withdrawing the vehicle from that compartment back into the elevator, suitable fastening means being provided for retaining the vehicle on the propelling means. Both the propelling means and the fastening means, as well as the elevator itself, are all operable from a single control panel or station, whereby a single operator is enabled, after a vehicle has been placed on the elevator, to raise the elevator to a selected floor and then cause the vehicle to be moved into a selected storage compartment on that floor, release the vehicle from the propelling means, retract the propelling means onto the elevator, and then lower the elevator to its starting position, or into position to receive a vehicle from any other storage compartment. Similarly, the single operator is enabled to operate the controls so as to move the elevator when empty, into position to receive a vehicle from any storage compartment, withdraw the vehicle therefrom onto the elevator, and then bring the elevator to the ground floor.

A vehicle-storage device embodying the present invention comprises a structure indicated in its entirety at 11, having one or more floors 12 above the ground floor 13. Each of the floors 12, 13 may consist merely of two or more oppositely disposed runways 14, each adapted to receive the wheels of a vehicle such as an automobile 16. In this connection it should be observed that the word "floor" has been used herein in its broader sense, i. e., merely to indicate a parking lot or one of several different levels on which storage compartments are provided and not to indicate that the structure necessarily is closed.

At suitable location within the structure 11 and preferably between two opposed storage compartments or runways on each of the floors 12, 13, a space 19 is provided for a shaft to accommodate the elevator 21, the operating mechanism for which is conventional and not shown.

The elevator 21 comprises preferably a floor 22 and two spaced, elevated runways 23 adapted to be brought into alignment with the runways 14 of any one of the several storage compartments when the floor 22 of the elevator is brought into registry with the floor of that compartment. Hence the runways 23, 14 cooperate in guiding the vehicle being moved from the elevator into any compartment, and vice versa.

Also mounted upon the elevator 21 and preferably between the two runways 23 thereof, is a carriage 26. This carriage comprises a body portion 27 supported upon flanged wheels 28 which, in turn, rest upon and are guided by tracks 29 extending longitudinally of the elevator 21. Consequently, the carriage 26 is mounted for reciprocatory movement longitudinally of the elevator 21; and since extension tracks 31 are provided in each of the compartments 18 in position for the tracks 29 of the elevator to be brought into alignment therewith, means are provided for permitting the carriage 26 to move beyond the associated end of the elevator 21 and into position at least partially over the floor 17 of any of the compartments.

The carriage 26 is provided with fastening means now to be described for connecting it to the vehicle 16 to be moved thereby from the elevator 21 into any one of the compartments or from a compartment back to the elevator. Since it is desirable to provide for an additional amount of reciprocatory movement as compared with that of which the carriage 26 is capable, the fastening means is mounted upon the carriage 26 through the expedient of a head 36 mounted for reciprocatory movement with respect to the body 27 of the carriage 26. With this object in view, the body 27 preferably is of channel construction, i. e., a flange 37 extends upwards from each lateral edge of the bottom of the body 27. In order to minimize danger of the parts becoming dislodged, each of the flanges 37 preferably is provided with an inwardly extending guiding flange 39 slidably seated within a complementary groove 41 in the associated lateral face of the head 36.

Rigidly mounted upon the head 36 is an elongated cylinder 46 substantially corresponding in length to the body 27 of the carriage 26, which is only slightly shorter than the bed or floor 22 of the elevator 21. A pair of opposed piston heads 47 are fitted for movement within the cylinder 46; and each head has a piston rod 48 rigid therewith and extending therefrom toward the associated end of the tube 46. However, instead of extending out through the end 49 of the cylinder, each of the rods 48 extends angularly therefrom through a slot 51 formed in the upper wall of the cylinder 46 and extending longitudinally and diagonally thereof through a distance substantially corresponding to the stroke of the associated piston 47. Consequently, each of the angularly extending ends 52 of the rods 48 provides means for engaging the ends of a vehicle which is disposed over the carriage 26. Thus it may be seen that if fluid under pressure be supplied to the cylinder 46 outside of the piston heads 47, as by means of flexible conduits 53, the two piston heads 47 may be forced toward each other, drawing the two vehicle-engaging arms 52 toward each other until they engage the ends of the vehicle 16 and thus serve to immobilize the vehicle with respect to the carriage 26. Another flexible conduit 54 connects with the cylinder 46 between the two piston heads 47 so as to permit introduction of fluid under pressure to this portion of the cylinder for the purpose of separating the piston heads 47 and thus forcing the vehicle-engaging arms 52 apart to release the vehicle. As the arms 52 are moved outwardly along the diagonal portions 51a of the slots, they are rotated about their longitudinal axes into the lowered position of Fig. 3. Each of the rods 48 extends through a suitable stuffing box or packing 56 so as to prevent escape of the motivating fluid from the outer ends of the cylinder 46.

The conduits 53 and 54 preferably are contained within a single flexible sheathing 57 to facilitate their being wound simultaneously upon a reel 58 which is journalled upon the carriage 26. This reel 58 preferably is provided with spring means (not shown) for winding the sheathing 57 with its contained conduits 53 and 54 thereupon as the head 36 moves inwards with respect to the carriage 26, but to permit the head 36 to move outwards without undue interference.

Since it is intended that all of the mechanism shall be operated from a station conveniently located upon any one of the floors of the storage structure, preferably the ground floor, to avoid the necessity of having an attendant accompany each vehicle as it is being moved on the elevator and being moved into or out of a storage compartment 18, a suitable control panel 66 is mounted in convenient location with both conduits 53, 54 leading thereinto, where each is provided with a control valve actuated by a control handle 67 and 68, respectively. A tube 70 leads to the valves from a compressor, not shown, and wires 75 extend between the control board and elevator motor.

Preferably the control panel 66 is also provided with a suitable switch handle 69 controlling the elevator motor, not shown, whereby raising and lowering of the elevator 21 may be effected.

Means now to be described are provided for moving the carriage 26 from the elevator 21 into any selected compartment 18 and from the compartment back to the elevator, said means being controlled through the expedient of a control handle 100 mounted upon the control panel 66.

The carriage 26 is provided adjacent each end with two pulleys 71 and 72, respectively, mounted for rotation about vertical and horizontal axes, respectively. Another pair of pulleys 73 are revolubly mounted on the bed 22 of the elevator, one of these pulleys 73 being disposed adjacent each end of the bed 22. The elevator 21 also is provided with a driving drum 74 actuated by a motor 76 or the like through the expedient of a drive belt 77. A flexible tension member such as a cable 78 is co-operatively associated with the drum 74 and the pulleys 71, 72, 73 so as to impart motion to both the carriage 26 and the head 36 when the motor 76 is energized. With this object in view, each end of the head 36 has one end 79 of the cable 78 attached thereto, whence that end 79 passes around the pulley 71 on the associated end of the carriage 26. After passing around the pulleys 71, the ends 79 of the cable cross each other and each extends to the opposite end of the carriage 26 where it passes around the associated pulley 72. Thence each of the ends 79 extends to the opposite end of the elevator 21 to pass around the pulley 73 there located; and from the pulleys 73 the cable 78 extends to the drum 74 upon which a bight is engaged in such a manner that one of the ends 79 of the cable is tightened and cable is let out to the other end when the drum 74 is rotated in one direction, whereas the opposite end of the cable is tightened when the drum is oppositely rotated. Say, for example, the drum 74 is rotated in clockwise direction as viewed in Fig. 6, this will impose tension upon that end 79 of the cable which extends to the left from the drum 74 and around the pulley 73 at the left-hand end of the vehicle. This is the same end as that which passes around the pulley 72 at the right-hand end of the carriage. Therefore, when this portion of the cable is tightened, the entire carriage 26 will be pulled to the left, causing the leading end of the carriage 26 to leave the elevator and be propelled into the compartment 18 with which the elevator is then aligned. However, since the pulleys 73 necessarily are spaced a distance apart less than the over-all length of the elevator bed, the carriage 26 cannot be propelled all the way off the elevator; therefore, a suitable stop 81 is provided in each of the compartments 18 to limit the distance that the carriage 26 can move thereinto. After such engagement has occurred, continued application of tension upon the end 79 of the cable which extends to the left of the drum 74 will cause this end of the cable to pass around the pulley 72 at the right-hand end of the carriage 26, thus applying tension upon that portion of the cable which extends from that pulley 72 to the pulley 71 at the left-hand end of the carriage and thence to the left-hand end of the head 36. Consequently, after the carriage 26 has come to rest by engagement with the stop 81, continued operation of the drum 74 in the same direction will cause the head 36 to move to the left with respect to the carriage 26, i. e., further into the compartment 18. The parts are so proportioned and arranged that this continued movement of the head 36 in addition to the extent of movement of which the carriage 26 is capable is sufficient to move a vehicle 16 from the elevator 21 and completely into the compartment 18.

After a vehicle has been so moved into a compartment 18, fluid under pressure is supplied to the cylinder 46 between the piston heads 47, as by manipulation of the control handle 68 on the panel 66. This will force the arms 52 outwards to release their engagement with the ends of the vehicle, and as they approach the outer limit of their stroke they will be turned downwards by the deflected or diagonal ends 51a of the slots 51 as described hereinabove. Thereafter the operator should cause the motor 76 to rotate in the opposite direction by suitable manipulation of the control handle 100, suitable circuit connection 75 between the handle 100 and the motor 76 being provided. This will cause the drum 74 to rotate in the opposite direction whereupon the tension in that end of the cable 78 which extends to the left from the drum 74 will be relieved and tension will be applied on the opposite end of the cable, i. e., upon the end which extends to the right from the drum 74 and connects with the right hand end of the head 36. Consequently, both the head 36 and the carriage 26 will be urged to move to the right, back toward their respective central locations.

Figs. 7 and 8 illustrate a lock which is employed to releasably fasten the head 36 to the carriage 26 upon return of the head to its central location upon the carriage. This lock comprises a solenoid 85 mounted upon the head 36 and in which a vertical pin 82 is guided for axial movement. The body portion 27 of the carriage 26 is provided with an aperture 83 so disposed that the lower end of the pin 82 is permitted to drop thereinto when the head 36 is in its central position on the carriage 26 and thereby lock the head and carriage together. However, the pin 82 is composed of suitable magnetic metal so that when the solenoid 85 is energized the pin will be drawn upwards, retracting the lower end from the aperture 83 and thereby releasing the head 36 from the carriage 26. Also mounted on the head 36 adjacent to pin 82 is a toggle switch 84, the movable finger 86 of which extends into the path of a flange 87 or other suitable abutment rigid with the pin 82, the parts being so proportioned and arranged that when the pin 82 is moved upwards the finger 86 is moved to its upper position, closing the switch 84, and when the pin 82 drops into its locking position the finger 86 is carried downwards, opening the switch 84.

Fig. 10 illustrates a similar electrically actuated lock for fastening the carriage 26 in its central location on the bed 22 of the elevator 21. This lock also comprises a solenoid 91 having a vertically movable pin 92 for its armature and carrying a flange 93 or other suitable abutment to actuate the finger 94 of a toggle switch 96 so as to close the switch when pin 92 is raised and open the switch 96 when the pin 92 drops to its lowermost position. Whereas the aperture 83 adapted to receive the lower end of pin 82 can conveniently be provided in a surface of the carriage which is uninterrupted throughout the entire extent of possible movement of the pin 82, it is necessary for the pin 92 of the carriage lock to pass across the space 97 at at least one end of the bed 22 of the elevator 21. Therefore, a relatively large foot 98 is provided upon the lower end of pin 92 to prevent interference with smooth passage of pin 92 across the space 97 even though the pin 92 may be dragging as the carriage moves the pin across the space 97. To accommodate this relatively large foot 98 a socket 99 slightly larger than the foot 98 is provided in the surface of the bed 22 of the elevator 21 when the carriage is moved to its central location upon the elevator.

As indicated in Fig. 11, both switches 84 and 96 are connected in parallel with each other and in series with the motor 76 in its circuit connection 75, with the result that when both the head 36 and the carriage 26 are in their respective central locations, thus permitting both locking pins 82 and 92 to drop, and thereby opening both switches 84 and 96, it will be impossible to close the circuit 75 and energize the motor 76. However, so long as either or both of the pins 82 and 92 remain out of their respective locking positions, the circuit 75 can be completed by closing the control switch 100 on the control panel 66. Consequently, when the head 36 and the carriage 26 are being retracted from a compartment 18 back on to the elevator 21, no matter which one of these members arrives at its central location first and becomes locked therein, the motor 76 will be enabled to continue operation until the other member arrives at its central location, because the switch on the lock of this member which is still moving is kept closed and serves to complete the motor circuit 75. However, after both the head 36 and the carriage 26 have returned to their central positions and their respective locks become engaged, with the result that both switches 84 and 96 are open, the operator still is enabled again to energize the motor 76 when he again desires to move the carriage 26 and its head 36 with respect to the elevator. For this purpose, the solenoids 85 and 91 are connected by a circuit connection 101 to a control switch 102 on the panel 66. The closing of this switch 102 will energize both solenoids 85 and 91, thus not only releasing the head 36 for movement with respect to the carriage 26 and also releasing the carriage 26 for movement with respect to the elevator 21, but also closing both switches 84 and 96 so that the operator then, by proper manipulation of switch 100 can energize the motor 76, to turn in the desired direction.

Thus it may be seen that a single operator is enabled to operate the entire storage facility. After a customer has driven his vehicle onto the receiving floor, i. e., the street floor, and the vehicle has been placed on the elevator 21, the operator, without leaving his station, can manipulate the handle 67 to immobilize the vehicle on the elevator and then raise the elevator to any selected one of the upper floors, whereupon by manipulation of the handle 100 he can cause the carriage 26 with its head 36 to move either to the right or the left, thus moving the vehicle from the elevator into whichever one of the compartments 18 he may select. After the vehicle has thus been parked, the operator, by manipulating the control handle 66, causes the vehicle-engaging arms 52 to release the vehicle and then to assume their retracted position, whereupon the operator reverses the position of the handle 100 to cause retraction of the head 36 and carriage 26 onto the elevator 21. If there is immediate use for the elevator he then again can manipulate the handle 69 in whichever direction is called for by the circumstances.

When the customer returns to receive his vehicle the operator, by manipulating the control handle 69, causes the elevator 21 to move into alignment with the floor of the compartment wherein the vehicle has been stored, then by suitable manipulation of the handle 100 causes the carriage with its vehicle-engaging mechanism to move from the elevator 21 to the compartment and under the vehicle. The operator then manipulates the control handle 67 to cause the arms 52 to be raised and then moved inwards to engage the vehicle and thus immobilize it with respect to the head 36. The vehicle is then can be moved onto the elevator by suitable operation of the control handle 100; and thereafter the vehicle can be transported to the receiving floor 13 by operation of the handle 69.

Whereas in the modification thus far described, the elevator 21 corresponds substantially in width to a single storage compartment 18 and thus is enabled to serve a single opposed pair of compartments upon each floor of the storage facility, Fig. 13 illustrates a modified form of construction wherein the elevator 106 is provided with a bed 107 wide enough to accommodate a plurality of compartments at each end of the elevator. A transversely movable support 108 is mounted upon the bed 107 through the expedient of grooved wheels 109 engaged upon rails 111 on the bed 107 so that the support 108 can be moved laterally to bring a carriage 112 carried thereby and its cylinder-supporting head (not shown) into alignment with any selected compartment on any floor of the storage facility.

Fig. 14 shows a still further modified form wherein the bed 121 of the elevator 122 carries a support 123 mounted for rotary movement about a vertical axis by means of a central pivot 124. Hence this modification is adapted to serve a plurality of storage compartments arranged radially upon each floor of the storage facility by rotating the support 123 to bring the carriage 126 thereon into alignment with the selected compartment.

I claim:

1. In vehicle storing means having storage compartments and a common carrier for selectively transporting vehicles to and from the compartments, a vehicle transferring member mounted on the carrier for movement into and out of the compartments and means associated with the transferring member to releasably engage a vehicle on the latter, comprising a pair of arms disposed longitudinally of the said member and adapted to oppositely engage the respective ends of a vehicle, means mounting the arms for movement towards and away from each other, means associated with the last-named means operative to impart swinging movement to the arms in a direction transverse of the vehicle being engaged in response to their movement towards and away from each other, and means for moving the arms towards and away from each other.

2. In vehicle storing means having storage compartments and a common carrier for selectively transporting vehicles to and from the compartments, a vehicle transferring member mounted on the carrier for movement into and out of the compartments, vehicle engaging means carried by the transferring member, said vehicle engaging means being mounted for axial movement in opposite directions as well as for swinging movement about an axis longitudinally of the transferring member to effect engagement with the vehicle, and means for so moving the vehicle engaging means.

3. In vehicle storing means having storage compartments and a common carrier for selectively transporting vehicles to and from the compartments, a vehicle transferring member mounted on the carrier for movement into and out of the compartments and means associated with the transferring member to releasably engage a vehicle thereon, comprising a cylinder mounted longitudinally of the transferring member, a pair of opposed pistons reciprocally mounted in the cylinder, a piston rod secured to each piston and projecting outwardly therefrom, a diagonal slot in each end portion of the cylinder, and a pair of arms carried one by each of the respective rods and projecting radially from the cylinder through and being movable along said slot upon movement of the pistons whereby to be movable to and from positions perpendicular to the transferring member for opposed engagement with and disengagement from the vehicle, and pressure applying means for oppositely moving the pistons.

4. In vehicle storing means having storage compartments and a common carrier for selectively transporting vehicles to and from the compartments, a vehicle transferring member mounted on the carrier for movement into and out of the compartments and means associated with the transferring member to releasably engage a vehicle thereon, comprising a pair of arms adapted to oppositely engage the respective ends of a vehicle, means mounting the arms for movement towards and away from the other, means associated with the last-named means operative to impart swinging movement to the arms about an axis longitudinally of the vehicle transferring member in response to their movement towards and away from each other, and means for moving the arms towards and away from each other.

5. In vehicle storing means having storage compartments and a common carrier for selectively transporting vehicles to and from the compartments, a vehicle transferring member mounted on the carrier for movement into and out of the compartments and means associated with the transferring member to releasably engage a vehicle thereon, comprising a pair of arms mounted for swinging movement about an axis longitudinally of the transferring member and means for moving at least one of the arms towards and away from the other.

6. In vehicle storing means having storage compartments and a common carrier for selectively transporting vehicles to and from the compartments, a vehicle transferring member mounted on the carrier for movement into and out of the compartments and means associated with the transferring member to releasably engage a vehicle on the latter, comprising a piston mounted on the vehicle transferring member for axial movement relative thereto towards and away from an end of a vehicle positioned on the carrier, a vehicle engaging arm carried by said piston for swinging movement relative to the vehicle transferring member in a direction transversely thereof, means for axially moving said piston, means responsive to axial movement of the piston to swing said arm and an abutment member on the vehicle transferring member for engagement with the other end of a vehicle positioned on the carrier.

RICHARD L. SINCLAIR.

REFERENCES CITED

The following references are of record in the file of this patent:

UNITED STATES PATENTS

| Number | Name | Date |
|---|---|---|
| 1,896,063 | Bottini | Feb. 7, 1933 |
| 2,073,721 | Wheelock | Mar. 16, 1937 |
| 1,584,080 | Dinkelberg | May 11, 1926 |
| 1,828,307 | Been | Oct. 20, 1931 |
| 1,864,711 | Buettell | June 28, 1932 |
| 1,919,269 | Becker | July 25, 1933 |
| 2,047,347 | Wheelock | July 14, 1936 |
| 2,113,986 | Kent | Apr. 12, 1938 |
| 1,886,588 | Riblet | Nov. 8, 1932 |
| 2,321,253 | Schellentrager | June 8, 1943 |
| 2,292,763 | Lennox | Aug. 11, 1942 |
| 1,094,026 | Simmonds | Apr. 21, 1914 |
| 2,019,949 | Brace | Nov. 5, 1935 |
| 1,478,676 | Richey | Dec. 25, 1923 |